US010293354B2

(12) United States Patent
Bandawat et al.

(10) Patent No.: US 10,293,354 B2
(45) Date of Patent: May 21, 2019

(54) HANDHELD MISTING DEVICE WITH PRESSURE-RELIEVING HANDLE

(71) Applicant: Misty Mate, Inc., Scottsdale, AZ (US)

(72) Inventors: David Bandawat, Los Angeles, CA (US); April LaCerra, Los Angeles, CA (US)

(73) Assignee: Misty Mate, Inc., Scottsdale, AZ (US)

(*) Notice: Subject to any disclaimer, the term of this patent is extended or adjusted under 35 U.S.C. 154(b) by 0 days.

(21) Appl. No.: 15/387,398

(22) Filed: Dec. 21, 2016

(65) Prior Publication Data
US 2018/0169678 A1 Jun. 21, 2018

(51) Int. Cl.
B05B 11/00 (2006.01)
B05B 9/08 (2006.01)
F16B 5/00 (2006.01)
F16B 3/00 (2006.01)
B05B 15/63 (2018.01)

(52) U.S. Cl.
CPC ........ B05B 11/0039 (2018.08); B05B 9/0827 (2013.01); B05B 15/63 (2018.02); F16B 3/00 (2013.01); F16B 5/008 (2013.01); F16B 5/0092 (2013.01)

(58) Field of Classification Search
CPC ............... B05B 11/0018; B05B 11/306; B05B 11/3038; F16B 5/008; F16B 5/0092; F16B 5/10; F16B 12/2009; F16B 21/02; F16B 9/09; F16B 3/00; F16L 37/24; Y10T 403/7005; Y10T 403/7009
USPC .................. 222/401; 403/345, 348
See application file for complete search history.

(56) References Cited

U.S. PATENT DOCUMENTS

| 1,246,213 | A |   | 11/1917 | Zawels et al. |
| 1,935,688 | A |   | 6/1930 | Wilbur |
| 2,091,735 | A |   | 12/1936 | Jepson |
| 2,106,620 | A | * | 1/1938 | Nilson ...................... F04B 9/14 222/376 |
| 3,219,373 | A | * | 11/1965 | Sutliff ................... E21B 17/046 285/18 |
| 3,955,720 | A | * | 5/1976 | Malone ................. B05B 7/0037 222/396 |
| 4,154,401 | A |   | 5/1979 | Thompson |
| 4,606,477 | A |   | 8/1986 | Spengler et al. |
| 4,905,576 | A | * | 3/1990 | Reynolds ................ B60T 11/16 403/315 |
| 5,267,674 | A |   | 12/1993 | Schuckmann |
| 5,335,855 | A |   | 8/1994 | Borod |

(Continued)

Primary Examiner — Darren W Gorman
Assistant Examiner — Qingzhang Zhou
(74) Attorney, Agent, or Firm — Quarles & Brady LLP

(57) ABSTRACT

A misting device has a form factor that allows the device to be handheld. The device includes a fluid tank that can be pressurized to force the contained fluid under pressure through a fluid delivery system. A hand-operated pump injects air into the fluid tank to pressurize the fluid tank. The pump includes a pump handle located at the bottom of the tank at one end of a rod, and a piston at the other end of the rod. A pressure-relieving air channel extends through the piston, the rod, and the pump handle to emit air out of the pump and into the environment when the fluid tank is at a maximum pressure. A pressure relief valve is disposed inside the piston to control the flow of air through the air channel. The pump handle locks against the tank using a "twist-and-lock" mechanism to remain secured in a retracted position.

8 Claims, 11 Drawing Sheets

(56) References Cited

U.S. PATENT DOCUMENTS

| | | | |
|---|---|---|---|
| 5,535,951 A | 7/1996 | Utter | |
| 5,620,140 A | 4/1997 | Utter | |
| 5,749,502 A | 5/1998 | Hinds | |
| 5,775,590 A | 7/1998 | Utter | |
| 5,967,415 A | 10/1999 | Utter | |
| 6,402,056 B1 | 6/2002 | Lin | |
| 7,562,794 B2 * | 7/2009 | Van De Braak | B65B 31/047 222/341 |
| D618,113 S | 6/2010 | Bandawat et al. | |
| 8,070,140 B2 | 12/2011 | Bandawat et al. | |
| 2004/0262329 A1 | 12/2004 | Byron | |
| 2017/0045246 A1 * | 2/2017 | Kaleta | F24F 6/14 |

* cited by examiner

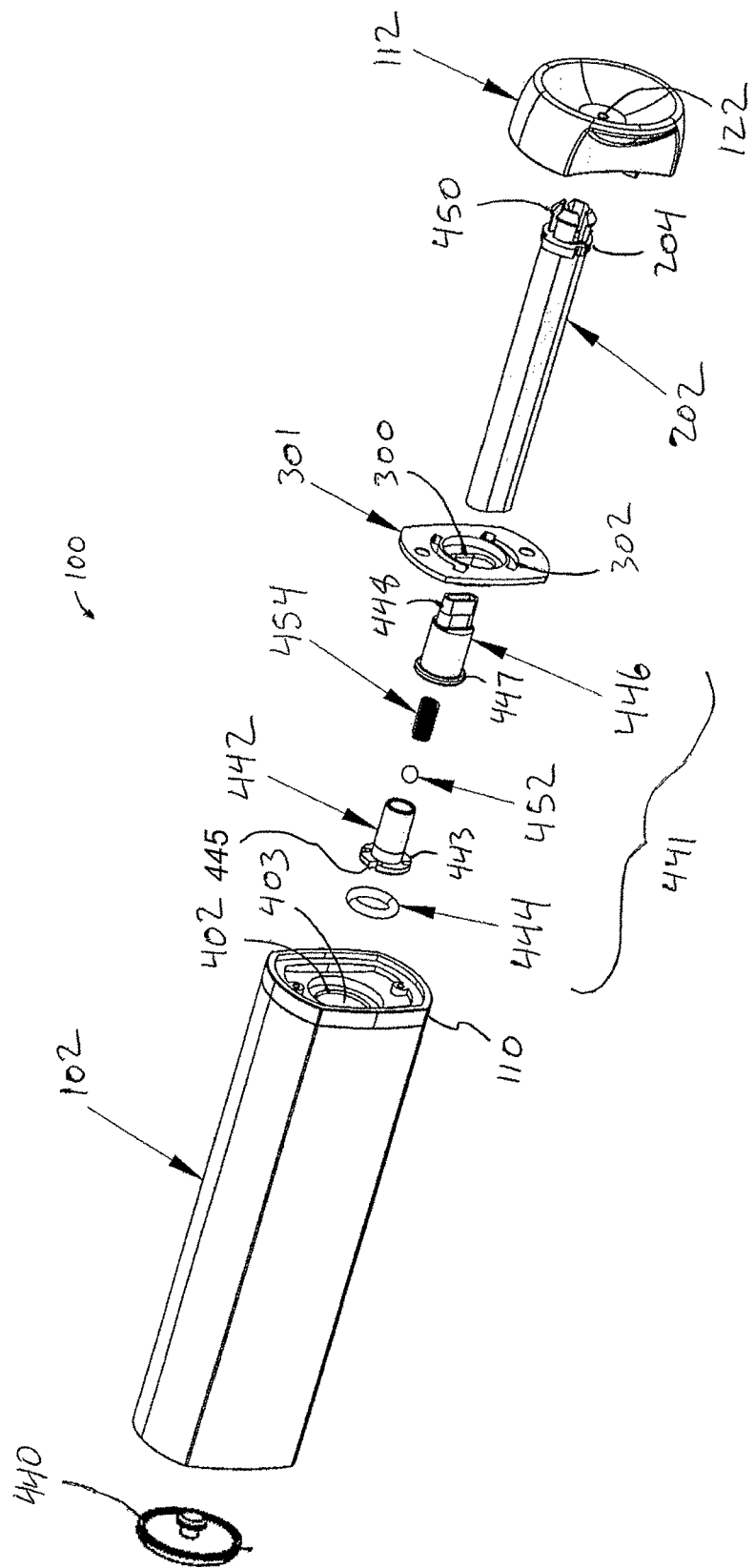

HANDHELD MISTING DEVICE WITH PRESSURE-RELIEVING HANDLE

BACKGROUND

Evaporative coolers can be made to cool a localized area by emitting a mist into the area. Personal misting devices serve as evaporative coolers, spraying the mist onto a user's skin and in his vicinity; the evaporation of the mist provides the cooling effect. An easily transportable, handheld misting device, or "mister," must be pressurized in order to force a contained liquid, usually water, through the atomizer of the device and emit the liquid as a mist. Personal, portable misters can be powered, such as by a battery, to pressurize and/or pump the liquid; however, the container can instead be manually pressurized via a hand pump, eliminating the requirement for a separate power source of pressurization. A typical hand pump is directly attached to a small water tank, and the user manually reciprocates the pump handle to force air into the tank to pressurize it. The device is turned on by opening a flow valve, and a fine mist is emitted from a nozzle.

A common problem for most prior art devices is that the user cannot tell if the container is sufficiently pressurized to emit a fine mist without testing it by opening the valve. A container that is insufficiently pressurized releases large drops of water slowly, rather than spraying a fine mist. Insufficient pressure therefore renders the apparatus useless for its purpose because the emission isn't a mist and, moreover, it is also messy. It would be desirable for the mister to indicate that a sufficient level of pressure has been reached before it is turned on, avoiding drips.

Another problem with prior art devices is that once the tank is pressurized, the handle may not properly seat in a closed position, being pushed out of position by the pressure in the tank.

BRIEF DESCRIPTION OF THE DRAWINGS

The detailed description is set forth with reference to the accompanying figures. The use of the same reference numbers in different figures indicates similar or identical items or features.

FIGS. 13A and 13B are together an exploded view of the device of FIG. 1.

DETAILED DESCRIPTION

Figure 1:
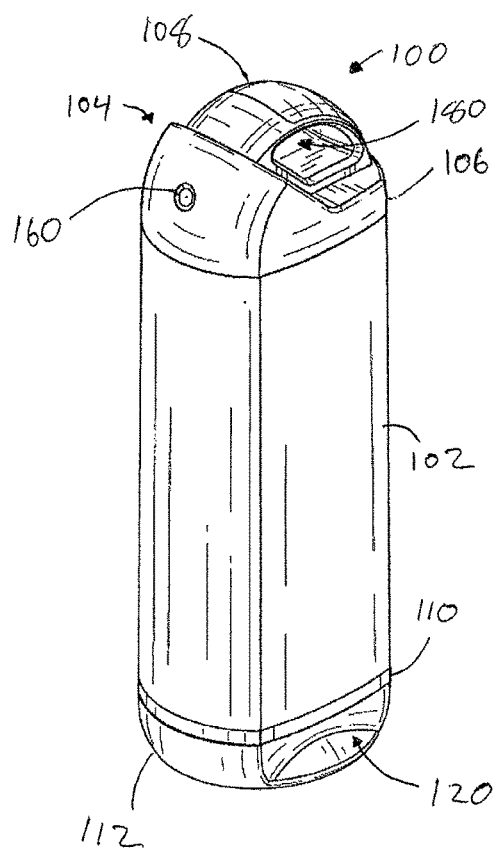
FIG. 1 is a top front perspective view of an exemplary personal misting device in accordance with the present disclosure.

In various embodiments described herein, a handheld misting device that may evaporatively cool a localized area by emission of a fine mist spray includes an integrated pump for pressurizing a fluid-containing chamber. The pump has a pump handle that extends from a bottom of the device; the handle includes a locking mechanism that cooperates with a corresponding locking mechanism on the body, or tank, of the device to lock and properly seat the handle in a retracted position whether or not the chamber is pressurized. The handle further includes a pressure relief channel that cooperates with a pressure relief valve to release air through the handle when the chamber is over-pressurized. The present device thus overcomes the above-mentioned drawbacks, providing a misting device that indicates when a suitable operating pressure is reached, prevents over-pressurization, and facilitates proper seating of the pump handle even when the device is under full pressure.

Referring to FIGS. 1-8, an exemplary misting device 100 in accordance with the present disclosure includes a fluid tank 102 that defines the body of the device 100. The tank 102 may contain the evaporative fluid, which is usually water but can be any fluid capable of making a mist. All acceptable fluids are referred to herein as water. The tank 102 is preferably lightweight, and may be opaque or transparent. The tank 102 may be of a size that facilitates the portability of the device 100, and in particular may have a size and shape that can be held in the hand of the user, allowing the user to direct the mist spray to cool his vicinity. A cap 104 is matedly attached to the tank 102 at the top of the tank 102. The cap 104 may be removably attached, so that the user can remove the cap 104 to add water to the tank 102. The cap 104 may include a base portion 106 and a carrying handle portion 108. The base portion 106 may abut the tank 102. In some embodiments, the size and shape (e.g., the perimeter at the lower, or widest, part) of the base portion 106 may correspond to the size and shape of the tank 102 such that the corresponding perimeters of the base portion 106 and the tank 102 align, giving the device 100 a substantially continuous profile—that is, the outer surface of the device 100 is substantially smooth through the transition from the tank 102 to the base portion 106 and vice-versa. The base portion 106 may include a nozzle 160 that emits the mist as described further below. The carrying handle portion 108 may be attached to or integral with the base portion 106 and provides a structure by which the device 100 may be carried by the user or attached to a tether, such as a carabiner or lanyard. The carrying handle portion 108 defines an aperture 180 through which the user can hook his fingers, a carabiner, a lanyard, etc.

The tank 102 may include a base member 110, or the base member 110 may be attached to the bottom of the tank 102. The base member 110 may enclose the fluid chamber and may provide other structures, including a mounting surface for a tank-side locking plate and a piston chamber for the pump as described further below. In some embodiments, the base member 110 may, like the base portion 106 of the cap 104, have a size and shape that corresponds to the size and shape of the tank 102 in order to continue the smooth outer surface of the device 100. A pump handle 112 may seat against and be extendable from the base member 110 in order to operate an air pump that pressurizes the tank 102. The pump handle 112 may also have a shape that further continues the smooth outer surface of the device 100, or at least a portion thereof as shown in the side views of FIGS. 5 and 6. The pump handle 112 may include one or more recesses 120 that provide gripping surfaces for the user's fingers; the user may grasp the pump handle 112 via the recesses 120 to unlock the pump handle 112 from the tank-side locking mechanism and pull the pump handle 112 away from the tank 102.

Figure 2:
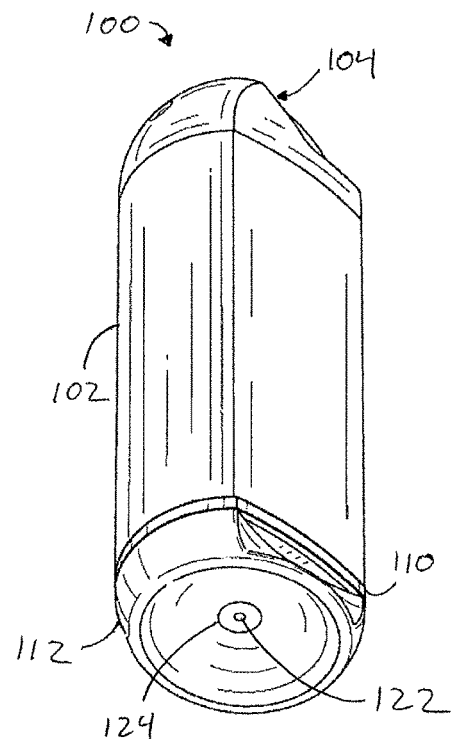
FIG. 2 is a bottom front perspective view of the device of FIG. 1.
Figure 3:
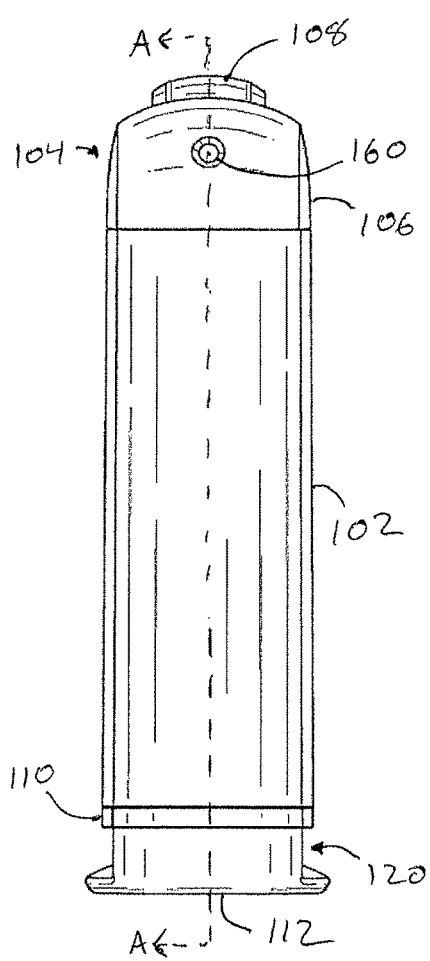
FIG. 3 is a front view of the device of FIG. 1.
Figure 4:
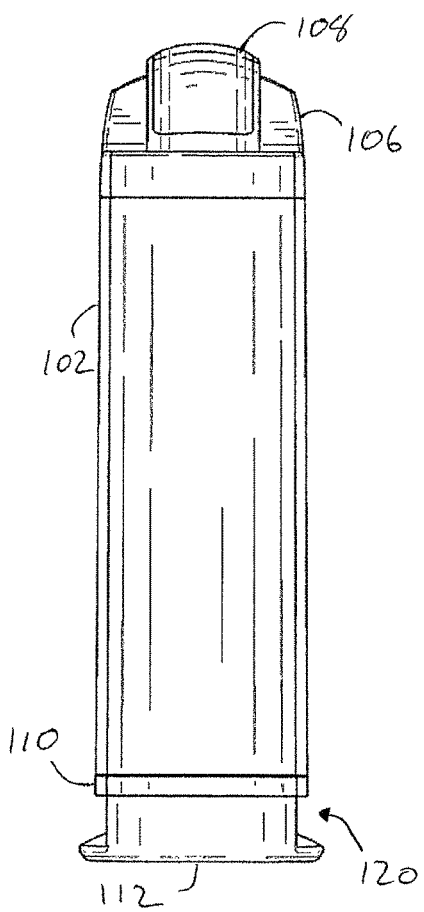
FIG. 4 is a rear view of the device of FIG. 1.
Figure 5:
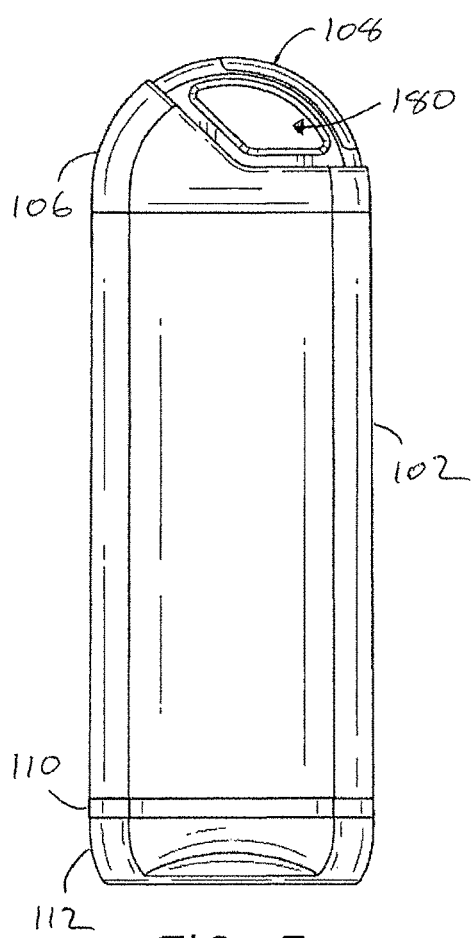
FIG. 5 is a right side view of the device of FIG. 1.
Figure 6:
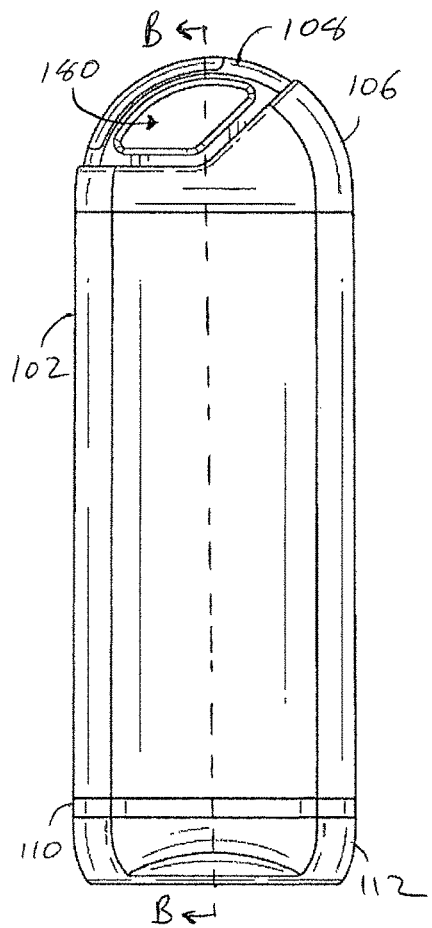
FIG. 6 is a left side view of the device of FIG. 1.
Figure 7:
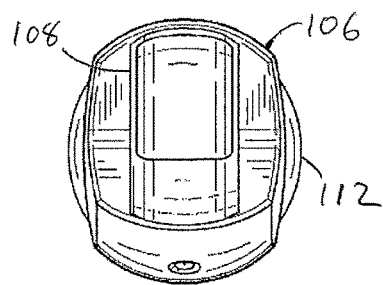
FIG. 7 is a top view of the device of FIG. 1.
Figure 8:
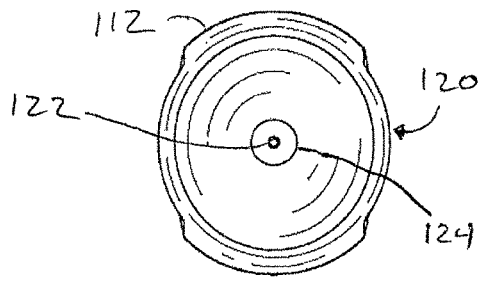
FIG. 8 is a bottom view of the device of FIG. 1.

The pump handle 112 may have a substantially planar bottom surface, as shown in FIGS. 3-6, so that the device 100 may be set upright on a table or other support surface. As illustrated in FIGS. 1, 2, and 8, for example, the bottom surface may further be circular and concave, or may at least have a concave portion in which is inset a relief aperture 122 at or approximate the center of the bottom surface. As described further below, the relief aperture 122 may be positioned at the end of a pressure relief channel disposed through the pump, and may release excess pressurize air from the device 100 into the environment. Such a release of air through the relief aperture 122 prevents over-pressurization of the tank 102 (or more accurately, the fluid chamber inside the tank 102) and further serves as an indicator to the user that the tank 102 has reached a maximum pressure. In some embodiments, the relief aperture 122 may be formed into the outer surface of the pump handle 112; in other embodiments, an insert 124 may be disposed within a larger aperture in the pump handle 112 outer surface, and the insert 124 may define the relief aperture 122.

Figures 9, 10:
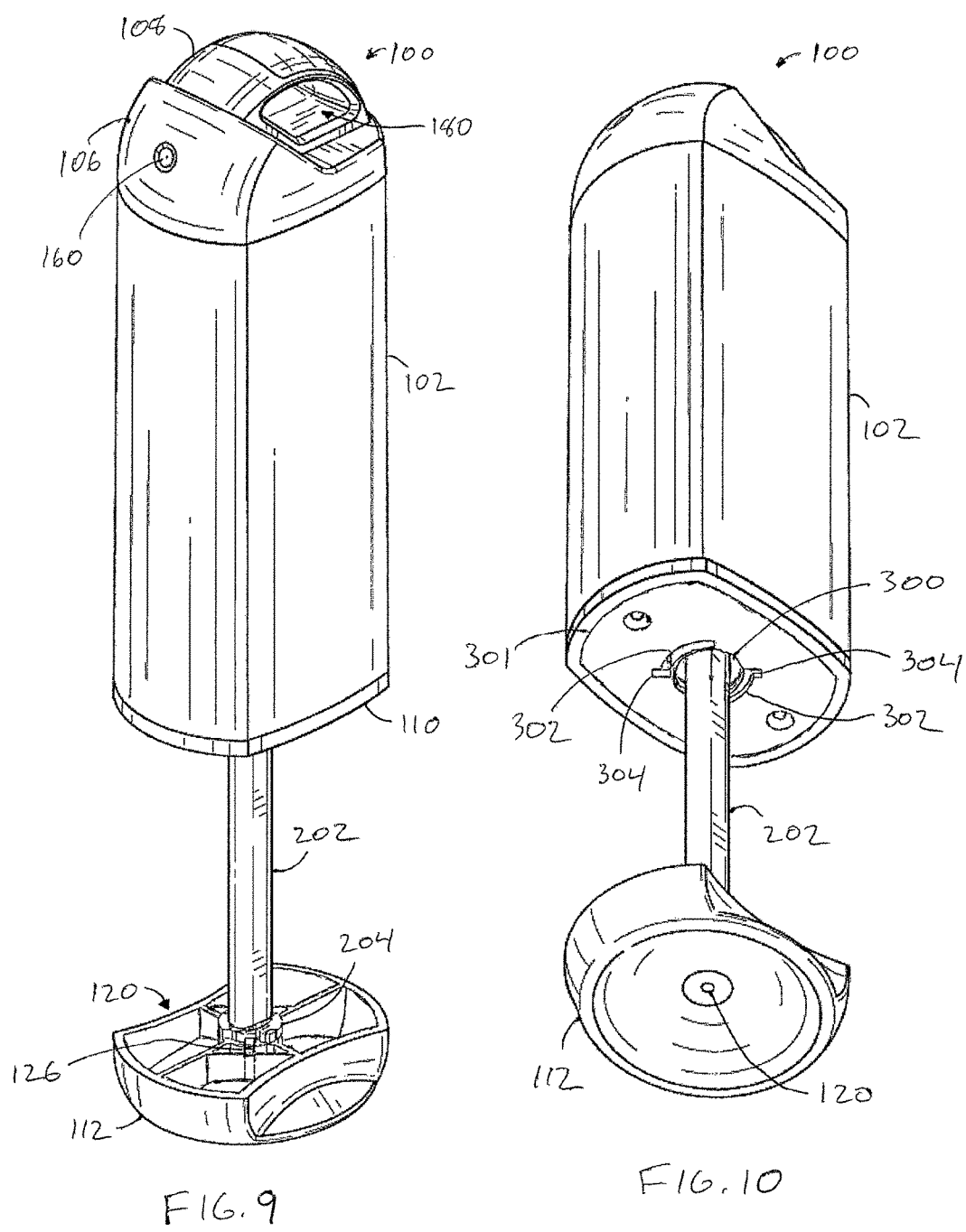
FIG. 9 is a top front perspective view of the device of FIG. 1 with the pump handle in an extended position.
FIG. 10 is a bottom front perspective view of the device of FIG. 1 with the pump handle in an extended position.
Figure 11:
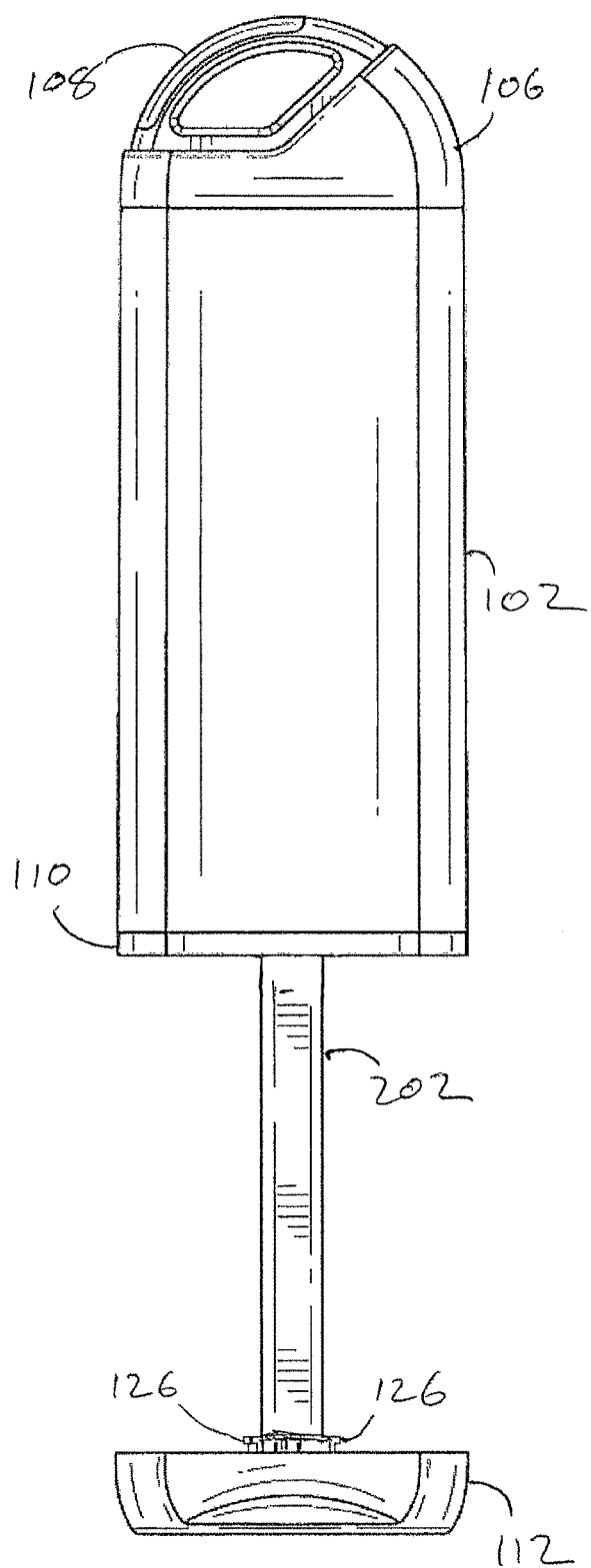
FIG. 11 is a left side view of the device of FIG. 1 with the pump handle in an extended position.

FIGS. 9-11 illustrate the device 100 with the pump handle 112 in an extended position. Pulling the pump handle 112 into the extended position draws air into the pump, and then depressing the pump handle 112 to the closed/retracted position of FIGS. 1-8 then injects the drawn-in air from the pump into the fluid chamber, as described further below. If there is sufficient air in the fluid chamber to pressurize the fluid chamber to its maximum pressure, any excess air in the pump is released through the relief aperture 122 as the pump handle 112 is depressed. The pump handle 112 may be mounted on or otherwise attached to a rod 202 that operates the piston in the pump. In particular, the pump handle 112 may be rotatably attached to the rod 202, as described further below, so that the pump handle 112 rotates around the axis of the rod 202. The rod 202 may include a mounting plate 204 at its distal end; the pump handle 112 may abut the mounting plate 204.

Figure 12:
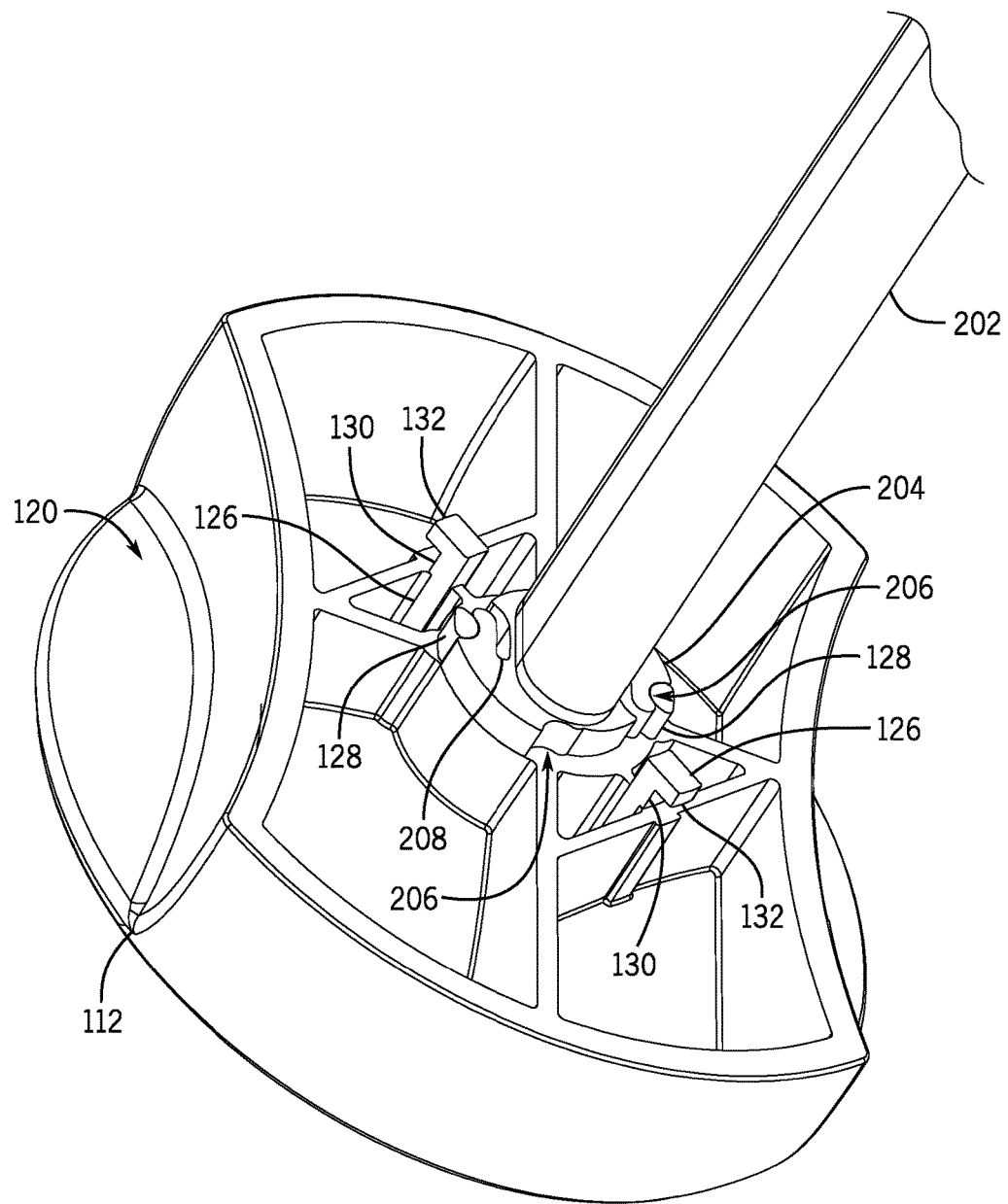
FIG. 12 is a perspective view of the pump handle of the device of FIG. 1 in an extended position.

As shown in FIG. 12, the mounting plate 204 and the pump handle 112 may include cooperating structures that lock the pump handle 112 in one or more rotated orientations with respect to the rod 202. In particular, the mounting plate 204 may include one or more recesses 206, and the pump handle 112 may include one or more posts 128 that fit into the recesses 206. The posts 128 are substantially rigid but have some resilience. As the pump handle is rotated 112, the posts 128 may slide over a portion of the mounting plate 204, being slightly disposed laterally and then returning to their original position within a corresponding recess 206. In some embodiments, the pump handle 112 may lock in a first orientation in which the locking mechanism between the pump handle 112 and the tank 102 is engaged and the pump handle 112 is in alignment with the tank 102 as shown in FIGS. 1-8. The pump handle 112 may further lock in a second orientation in which the locking mechanism is unlocked and the pump handle 112 may be extended from the tank 102.

Referring again to FIGS. 9-11, and as shown in particular in FIG. 10, the device 100 may further include a locking plate 301 attached to the tank 102 or to the base member 110. The locking plate 301 may include one or more structures that form the tank-side portion of the locking mechanism, cooperating with corresponding structures on the pump handle 112 and the mounting plate 204 to seat and lock the pump handle in the retracted/closed position. In some embodiments, the locking plate 301 may include one or more locking channels 302. The locking channels 302 may be configured to receive one of one or more locking tabs 126 that project from the ump handle 112. See FIGS. 9 and 12. The locking tab 126, as shown in FIG. 12, may have a narrow portion 130 that fits within the locking channel 302, and a wide portion 132 that fits into a receiving end 304 of the corresponding locking channel 302, but does not fit through the remainder of the locking channel 302. In some embodiments the locking mechanism may be a "twist-and-lock" mechanism: to lock the pump handle 112 in the closed position, the pump handle 112 is rotated (with respect to the rod 202) to align the locking tabs 126 with the receiving ends 304 of the corresponding locking channels 302; the locking tabs 126 are inserted into the locking channels 302 through the receiving ends 304; and, the pump handle 112 is rotated into the position of FIGS. 1-8, wherein the locking tabs 126 cannot be pulled through the locking channel 302 (due to the width of the wide portion 132); the pump handle 112 thus locks against the mounting plate 204 as described above.

Referring again to FIGS. 9 and 10, in such a twist-and-lock embodiment, the locking channels 302 may be arcuate so the locking tabs 126 can travel along them while the pump handle 112 is being rotated. The locking channels 302 may be disposed around an aperture 300 disposed through the center of the locking plate 301. The rod 202 may slide into the interior of the tank 102 through the aperture 300; the aperture 300 may be wide enough so that the mounting plate 204 also fits into the aperture 300, allowing the pump handle 112 to seat flush with the bottom of the tank 102/base member 110.

Figure 13A:
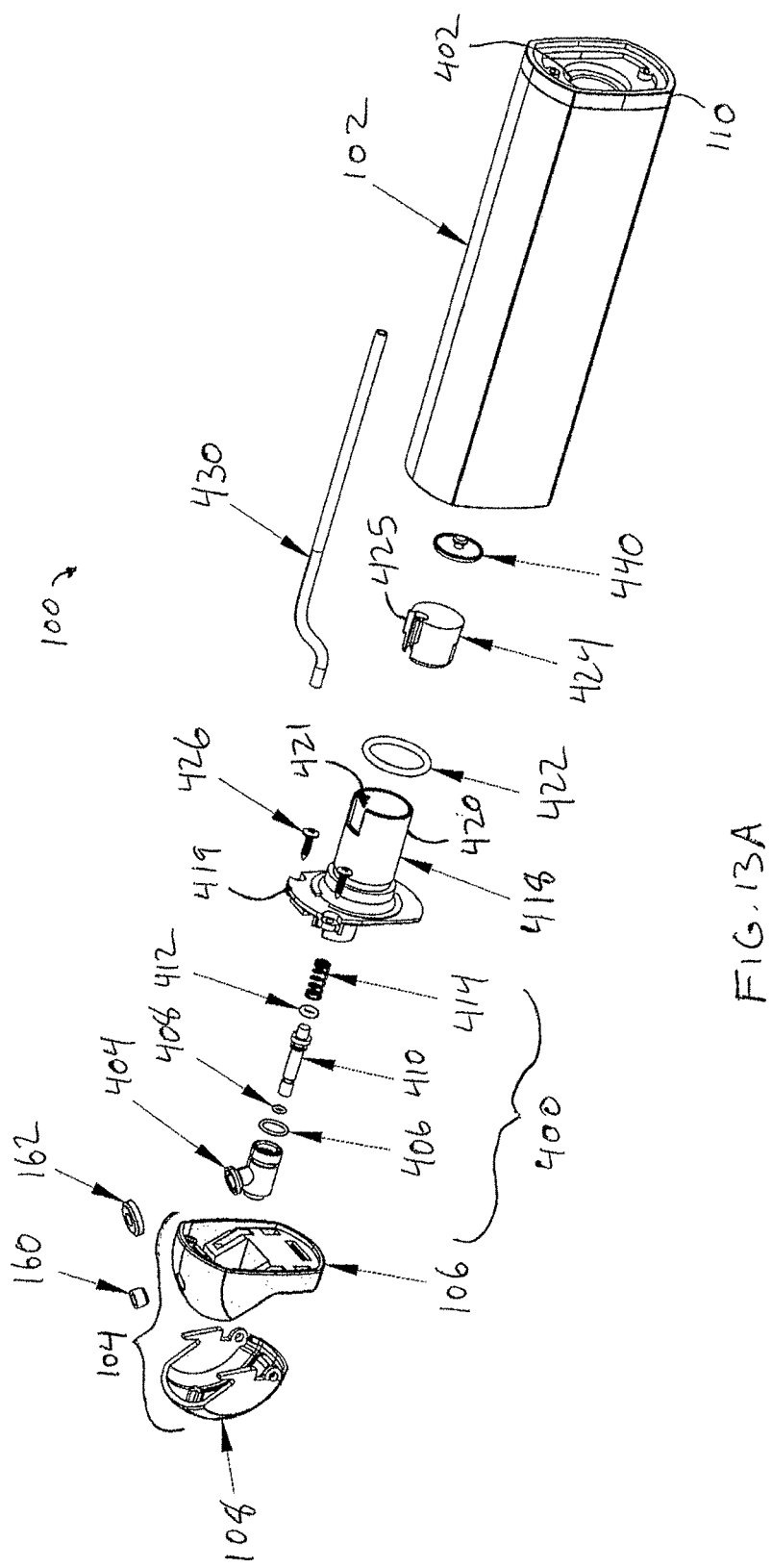

FIGS. 13A-B illustrate the exemplary device 100 in an exploded view, with the handle portion 108 at the proximal end and the pump handle 112 at the distal end of the device 100, to show the internal components of the pump and fluid delivery system. Referring to FIG. 13A, the fluid delivery system includes all of the components disposed substantially proximally to the tank 102, with the exception of the air valve member 440 (described below) that belongs to the pump. The fluid delivery system may have any suitable configuration for receiving a flow of fluid under pressure from the fluid chamber of the tank 102, atomizing the flow of fluid, and emitting the atomized fluid out of the device 100 into the surrounding environment as mist. In the illustrated example, the nozzle 160 is disposed through the base portion 106 of the cap 104 and interfaces with a fluid-tight seal 162 inside the cap 104. The nozzle 160 may be an atomizing nozzle that includes any suitable internal structures for atomizing the fluid flow delivered to the nozzle 160 through a fluid valve 400. The fluid valve 400 may be disposed partially or entirely within, and/or may be supported by, a tank interface member 418 that seals against the top of the tank 102 and attaches to the base portion 106 of the cap (e.g., via one or more fasteners 426 disposed through a sealing plate 419 of the tank interface member 418).

The fluid valve 400 is in fluid communication with the nozzle 160 and with a cannula 430 or similar flexible or rigid tube that extends into the tank 102. As illustrated, the fluid valve 400 includes a valve body 404 and a valve stem 410 that extends into the valve body 404 for actuating the fluid valve 400 as described below. The valve body 404 has at least one internal channel that connects to the nozzle 160 through the seal 162. The valve stem 410 occludes the fluid channel of the valve body 404 except when the fluid valve 400 is actuated. A valve spring 414 biases the valve stem 410 against a biasing surface of the tank interface member 418 (e.g., the top surface of the sealing plate 419) to place the fluid valve 400 in a normally-closed position. Various o-rings 406, 408, 412 and/or other gaskets and similar sealing devices may prevent leakage of the fluid into the interior of the cap 104 and/or into cavities of the tank interface member 418.

Figure 14:
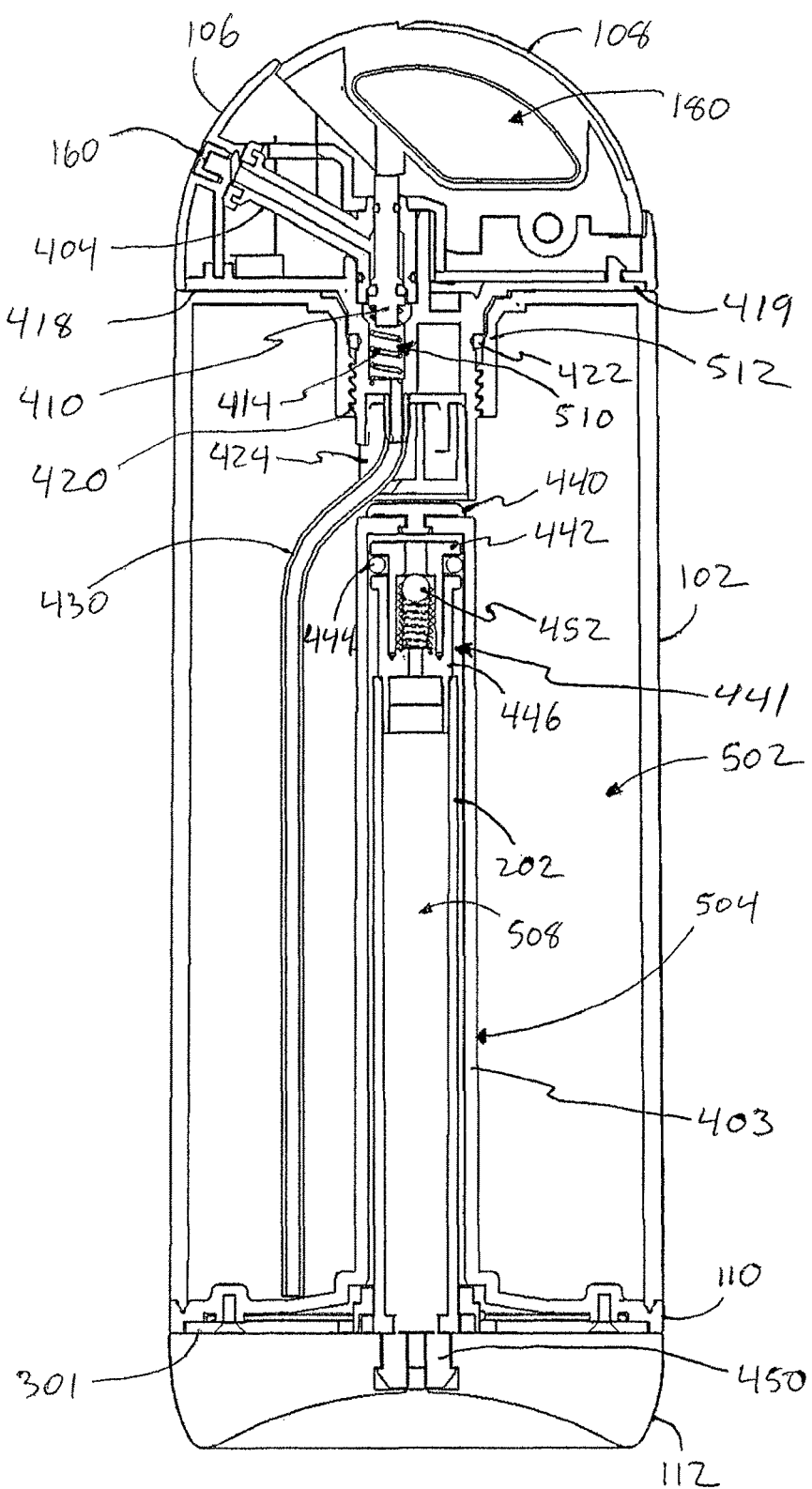
FIG. 14 is a cross-sectional right side view of the device of FIG. 1, taken along the line A-A of FIG. 3.
Figure 15:
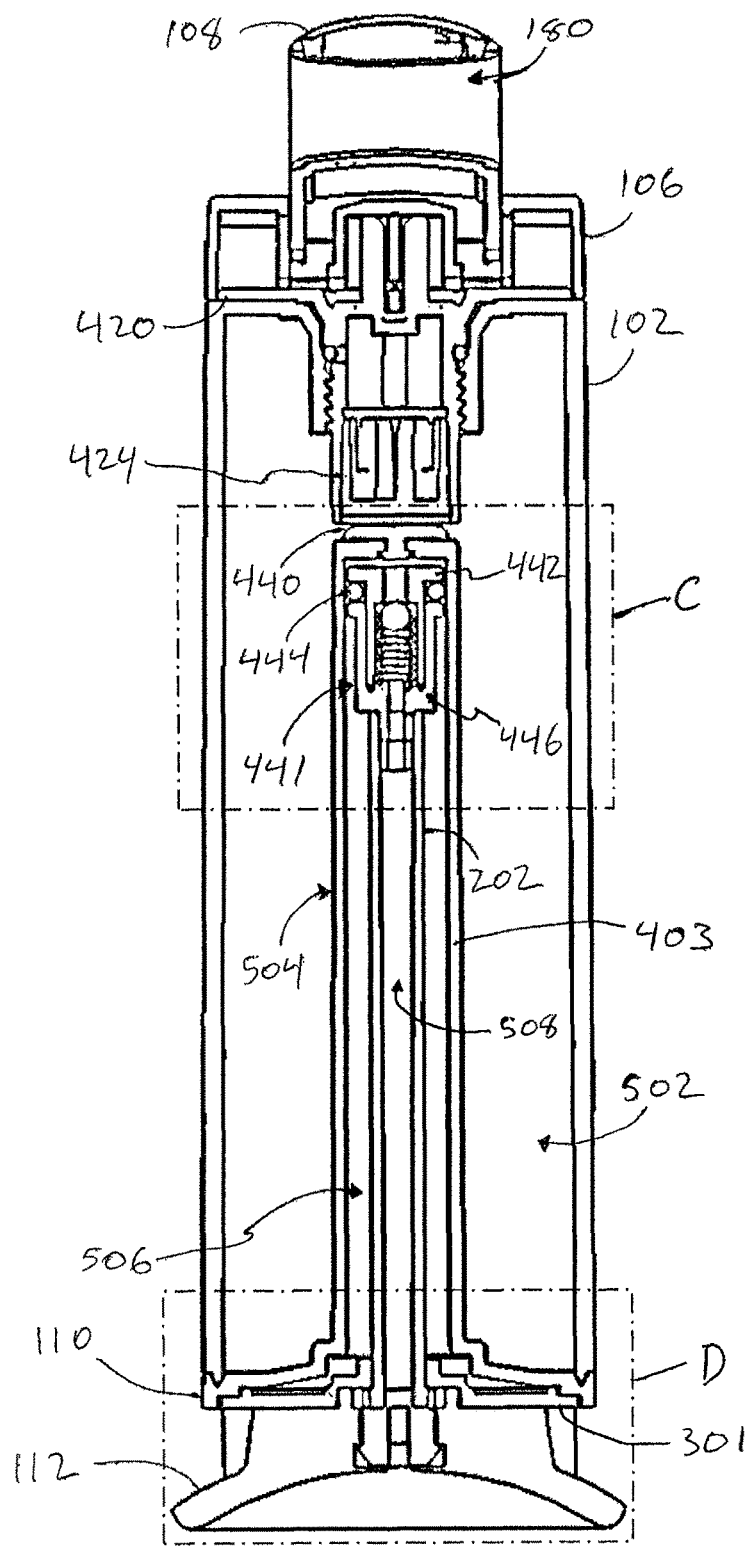
FIG. 15 is a cross-sectional front view of the device of FIG. 1, taken along the line B-B of FIG.

Distal to the sealing plate 419, the cannula 430 extends into the fluid chamber within the tank 102. See FIG. 14. The tank interface member 418 may further include a hollow mating cylinder 420 that attaches the tank interface member 418 to the tank 102 as described below. A retaining cap 424 may be disposed in the distal end of the mating cylinder 420 to seal the mating cylinder 420 against the ingress of fluid. The retaining cap 424 may include a clip 425 for retaining, by friction fit, the cannula 430 in a desired position. The clip 425 may fit in a notch 421 in the mating cylinder 420. In alternative embodiments, the mating cylinder 420 may have an enclosed distal end and may include the clip 425 integrated into the outer surface of the mating cylinder 420. An interface o-ring 422 may create a fluid-tight seal between the tank 102 and the tank interface member 418.

Referring to FIG. 13B, a locking-handle pump includes the components distal to the tank 102, as well as the air valve member 440 that is disposed inside the tank 102. In particular, the tank 102 and/or the base member 110 includes a hollow barrel 403 that extends proximally from the distal end of the tank 102 into the interior of the tank 102. A barrel aperture 402 forms the mouth of the barrel 403. The air valve member 440 is attached to the barrel 403 at the proximal end of the barrel 403 and controls airflow into the fluid chamber of the tank 102 as described below. A pressure-relieving piston 441 is disposed within the barrel 403. The piston 441 includes a cylindrical piston head 442 having a proximal-end flange 443 and internal structures that form a seat for a ball 452. The proximal-end flange 443 may include one or more slots 445 that create air passageways between the interior part of the barrel 403 that is proximal of the flange 443 and the interior part of the barrel 403 that is distal of the flange 443. The piston head 442 fits into a cylindrical piston body 446 that also has a flange 447 at its proximal end. The flanges 443, 447 cooperate to retain a piston o-ring 444 therebetween. The piston o-ring 444 creates a seal between the piston 441 and the inner surface of the barrel 403. This seal is fluid-tight and air-tight and is displaceable during operation of the pump, as described below. A neck 448 of the piston 441 is integral with or attached to the cylindrical portion of the piston body 446 and extends distally to connect the piston 441 to the rod 202. In the illustrated embodiment, the neck 448 is inserted into the proximal end of the rod 202 and is retained by adhesive or friction fit; in other embodiments, the piston body 446 may be integral with the rod 202.

The ball 452 is biased to a normally-seated position within the piston head 442 by a spring 454 that is supported by an internal surface of the piston body 446. The ball 452, spring 454, and seat inside the piston head 442 cooperate to form a pressure relief valve that controls air flow through an air channel formed from the proximal end of the piston head 442 through the piston head 442, the pressure relief valve, the piston body 446, the rod 202, and the pump handle 112 to the relief aperture 122. During operation of the pump, as long as the maximum pressure has not been attained in the fluid chamber, the ball 452 remains seated to close the pressure relief valve. The maximum air pressure is the amount of air pressure required to counteract the biasing force of the spring 454 and unseat the ball 452; thus, if the fluid chamber is at the maximum pressure, when the pump handle 112 is depressed the seal created by the ball 452 is compromised and air is allowed to pass from the proximal side of the pressure relief valve to the distal side thereof, as described further below.

Generally, the sealing components of the pump operate as follows. The air valve member 440 prevents air or fluid from being drawn from the fluid chamber into the barrel 403 during extension of the pump handle 112. Extending the pump handle 112 from the retracted position therefore creates an air pressure differential at the seal formed by the piston o-ring 444 as the air pressure proximal of the piston o-ring 444 decreases. When a critical differential (which is higher than the maximum pressure of the fluid chamber) is reached, the piston o-ring 444 displaces and allows air to pass from distal to the o-ring 444 through the slots 445 in the proximal-end flange 443 (the ball 452 remains seated throughout this operation). At the extended position of the pump handle 112, the barrel 403 is thus full or nearly full of air; the piston o-ring 444 reseals between the piston 441 and the barrel 403. The air valve member 440 seals against air forced against its distal side and is displaced at a lower pressure than the seal of the piston o-ring 444. Therefore, depressing the pump handle 112 toward the retracted position pushes the air in the barrel 403 through the air valve member 440 into the fluid chamber.

The pressure relief valve opens at a lower air pressure than is required to displace the seal of the piston o-ring 444. When the fluid chamber reaches the maximum pressure, the air valve member 440 will not allow any more air into the fluid chamber, so depressing the pump handle 112 compresses and pressurizes the air within the barrel 403 (i.e., between the piston o-ring 444 and the proximal end of the barrel 403) until the pressure overcomes the biasing force of the spring 454 and unseats the ball 452; the air in the barrel 403 then escapes through the air channel and is released through the relief aperture 122. The relief aperture 122 may be sized so that this air release is audible, providing a first indication that the maximum pressure is reached and the device 100 is ready to emit the appropriately-atomized mist. Additionally, the pump handle 112 is shaped so that the user places his hand over the bottom surface, and thus over the relief aperture 122, when the user grips the pump handle 112; thus, the user will feel the emission, onto his hand, of excess pressurized air from the relief aperture 122 when the user is depressing the pump handle 112.

In various embodiments, the rod 202 may have a cross-section that is circular, oval, stadium-shaped, rectangular, etc. The aperture 300 through the locking plate 301 may have a corresponding shape, thus fitting closely to the outer surface of the rod 202 to provide lateral support to the rod 202 during operation of the pump. Distal to the mounting plate 204, the rod 202 may terminate in a handle connector 450 that attaches to the pump handle 112 and facilitates rotation of the pump handle 112 around the axis of the rod 202. As illustrated, an exemplary handle connector 450 includes a plurality of posts arranged in a circular configuration and having flanges at the distal end that allow the posts to "snap" into a corresponding structure of the pump handle 112, described further below.

The components illustrated in the exploded views of FIGS. 13A-B may be assembled as illustrated in FIGS. 14, 15, and 16A-B. The tank 102 has a fluid chamber 502 within the walls of the tank 102 and outside the outer surface 504 of the barrel 403. The barrel 403 itself may be a part of the base member 110, as illustrated; thus, the base member 110 may be a single piece of molded plastic that attaches to the distal end of the tank 102, provides a planar member for receiving fasteners that attach the locking plate 301 to the base member 110, and forms the barrel 403. The barrel 403 forms a barrel chamber 506 that may be substantially empty or air-filled, and may be isolated from the fluid chamber 502 by the air valve member 440. The piston 441, rod 202, and piston o-ring 444 may be disposed in the barrel chamber 506 to manage air flow within the barrel chamber 506 as described herein. An air channel 508 runs through the pump as described above and is occluded by the pressure relief valve as described above.

The mating cylinder 420 may have a threaded outer surface, and a port 512 of the tank 102 may be cooperatively threaded to facilitate joining of the tank interface member 118 to the tank 102. The tank interface member 118 may further define a fluid cavity 510 that both retains the spring 414 of the fluid valve, and receives the fluid flow. That is, when the valve stem 410 is actuated, fluid in the pressurized fluid chamber 502 flows upward through the cannula 430 into the fluid cavity 510, past the valve stem 410 and into the valve body 404, and then to the nozzle 160. In some embodiments, the entire handle portion 108 of the cap 104 may be depressed to actuate the valve stem 410, which is in contact with the handle portion 108 as illustrated. In other embodiments, the handle portion 108 may include a button that is mechanically connected to one or more structures that actuate the valve stem 110 by moving the valve stem 110 distally. Releasing pressure on the button or handle portion 108 allows the spring 414 to move the valve stem 310 proximally and again occlude the fluid channel in the valve body 404.

Figure 16A:
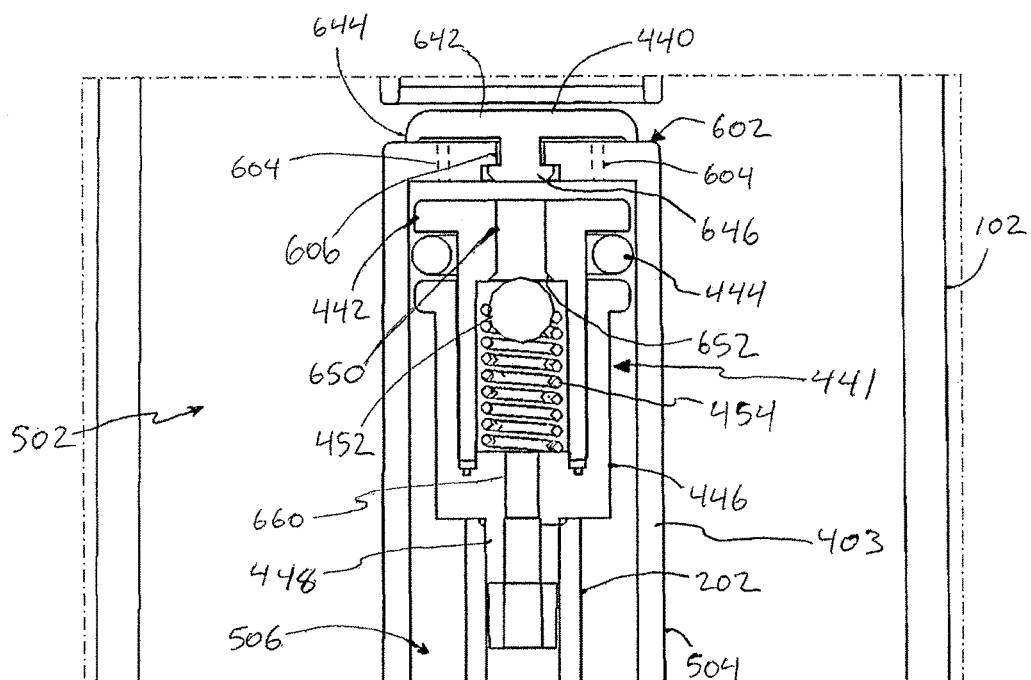
FIG. 16A is a close-up cross-sectional front view of the device of FIG. 1 at inset C of FIG. 15.

FIG. 16A provides a detailed view of the piston 441, proximal end 602 of the barrel 403, and air valve member 440. One or more air outlet channels 604 may be disposed through the barrel 403 at the proximal end 602 to inject air from the barrel chamber 506 through the air outlet channels 604 into the fluid chamber 502, pressurizing the fluid chamber 502. The air valve member 440 may be a rubber or other resilient member attached to the barrel 403 by disposing a flanged end 646 of the air valve member 440 through a proximal aperture 606 in the proximal end 602 of the barrel 403; the air valve member 440 is then held in place by friction fit. A disc-shaped body 642 of the air valve member 440 has a resilient flange 644 at its outer edge, which flange 644 extends distally into contact with the barrel 403 such that the air outlet channels 604 are disposed inside the circumference of the valve member body 642. In this manner, the air valve member 440 prevents ingress of air and fluid into the air outlet channels 604 from the fluid chamber 502. Furthermore, the body 642 and/or flange 644 has a suitable resilience that the flange 644 releases contact with the barrel 403 and allows air to flow from the air outlet channels 604 into the fluid chamber 502 until the maximum pressure in the fluid chamber 502 is reached. At the point of maximum pressurization, the air pressure on the proximal surface of the air valve member 440 is so high that it prevents the flange 644 from releasing contact with the barrel 403 when the piston 441 is actuated. Thus, the air in the barrel chamber 506 is compressed until it opens the pressure relief valve as described below.

In accordance with the description above, the piston head 442 has an air channel 650 disposed therethrough. The air channel 650 extends from the proximal end of the piston head 442 and widens to define a seat 652 of the pressure relief valve. The seat 652 is an angled surface against which the ball 452 is biased to seal the pressure relief valve closed, preventing proximal-to-distal airflow. The spring 454 biases the ball 452 via support from a planar surface in the interior of the piston body 446 as shown. Another air channel 660 extends from the proximal end of the piston body 446 through to the distal end of the neck 448.

Figure 16B:
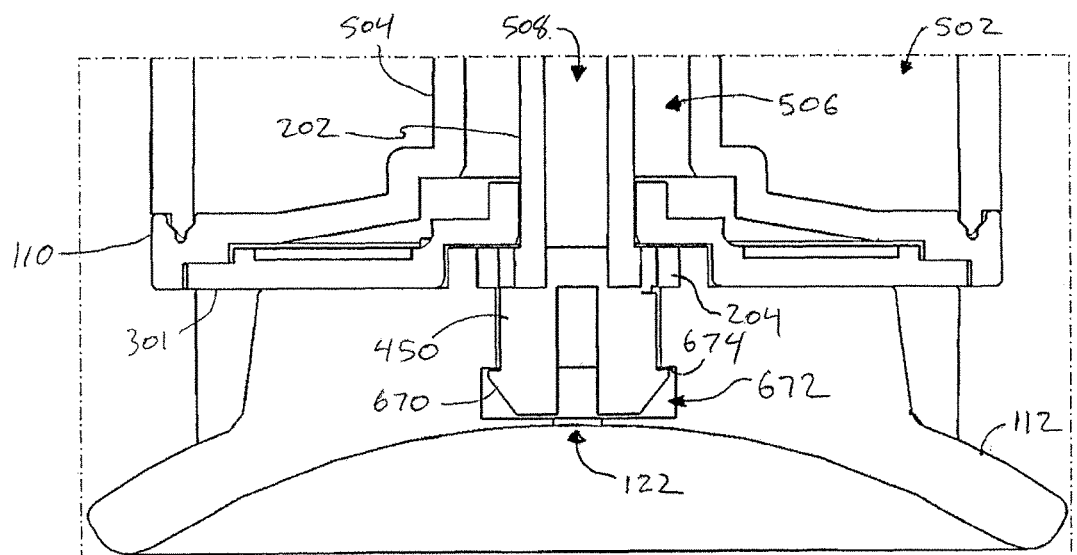
FIG. 16B is a close-up cross-sectional front view of the device of FIG. 1 at inset D of FIG. 15.

FIG. 16B provides a detailed view of the pump handle 112 interfaces with the other components of the pump and with the bottom of the tank 102. A plurality of surfaces of the pump handle 112 define a cavity 672 that receives the distal-end structures of the rod 202. The cavity 672 is shaped to receive the handle connector 450 and retain it by friction fit. For example, the handle connector 450 may flex to allow a flanged end 670 to be inserted into the cavity 672 and then return to its original position, whereby the flanged end 670 cooperates with a shoulder 674 in the cavity 672 to prevent withdrawal of the handle connector 450 from the cavity 672. Such insertion further seats the mounting plate 204 within the cavity 672; the pump handle 112 can rotate around the handle connector 450 between locked orientations that are facilitated by the mounting plate 204 as described above. The insertion further aligns the air channel 508 with the relief aperture 122.

In accordance with the above descriptions of exemplary embodiments, the present disclosure thus provides a misting device including, without limitation: a tank configured to be held aloft by a user in one hand, the tank having a proximal end and a distal end and comprising a fluid chamber for containing a fluid; a fluid delivery system in fluid communication with the tank and emitting, from near the proximal end of the tank, the fluid into a surrounding environment as mist; a barrel extending from the distal end of the tank into the fluid chamber, the barrel comprising a barrel chamber; a locking plate disposed at the distal end of the tank and comprising a first locking mechanism; and, a pump operable to pressurize the fluid chamber with air from the barrel chamber. The pump includes, without limitation: a rod having a proximal end disposed in the barrel chamber and a distal end that is distal to the distal end of the tank; a piston connected to the proximal end of the rod and forming an air-tight seal against an inner surface of the barrel; a pump handle connected to the distal end of the rod and operable by hand to move the piston axially within the barrel chamber, the pump handle comprising a second locking mechanism that engages the first locking mechanism to retain the pump handle against the locking plate; an air channel extending through the piston, the rod, and the pump handle, the air channel in fluid communication with the barrel chamber and, via an aperture in the pump handle, with the surrounding environment; and, a pressure relief valve disposed in the air channel such that, as the pump is operated, the pressure relief valve prevents airflow through the air channel while air pressure in the fluid chamber is below a maximum pressure and allows airflow through the air channel when air pressure in the fluid chamber is at the maximum pressure.

The pump handle may be rotatable around an axis of the rod, and when the pump handle is in a retracted position against the locking plate, rotating the pump handle in a first direction may engage the second locking mechanism with the first locking mechanism, and rotating the pump handle in a second direction may disengage the second locking mechanism from the first locking mechanism. The first locking mechanism may have an arcuate locking channel disposed through the locking plate, the locking channel having a receiving end that is wider than the remainder of the locking channel; the second locking mechanism may have a tab with a narrow portion that fits within the locking channel and a wide portion that fits into the receiving end but does not fit through the remainder of the locking channel. The rod may further include a mounting plate disposed in contact with the pump handle, the mounting plate having a recess. The pump handle may further include a post extending adjacent to the mounting plate, wherein rotating the pump handle in the first direction causes the post to contact the mounting plate, the post flexing away from a first position and returning to the first position when the post is rotated into alignment with the recess, the post and the recess cooperating to retain the pump handle in a first rotated orientation with respect to the rod.

In another embodiment, the present disclosure provides a misting device including a tank having a proximal end and a distal end and comprising a fluid chamber for containing a fluid, and a pump operable to pressurize the fluid chamber. The pump may include, without limitation: a pump handle disposed at the distal end of the tank and movable between a retracted position against the tank and an extended position, the pump handle being rotatable around an axis of the tank and having a locking mechanism that engages to lock the pump handle in the retracted position when the pump handle is rotated in a first direction; an air channel disposed through the pump handle; and, a pressure relief valve disposed in the air channel and allowing airflow through the air channel and out of the misting device when the pump is operated and air pressure in the fluid chamber is at a maximum pressure.

The air channel may include a relief aperture disposed in the pump handle and providing an indication to a user of the device when air is flowing out of the misting device through the relief aperture. The indication may be air blowing onto the user's hand. The misting device may further include a barrel disposed in the tank and defining a barrel chamber, the pump being configured to inject air from the barrel chamber into the fluid chamber to pressurize the fluid chamber when the pump handle is depressed from the extended position to the retracted position. Depressing the pump handle from the extended position to the retracted position when the fluid chamber is at maximum pressure may cause the air in the barrel chamber to flow through the air channel and out of the device. Further, the pump may include a piston disposed in the barrel chamber and forming an air-tight seal with the barrel, and a rod attached to the piston and extending out of the barrel chamber, the pump handle rotatably attached to the rod, and the air channel further being disposed through the rod and the piston. The pressure relief valve may be a ball valve disposed within the piston. The pump handle may include a post extending toward the tank, and the rod may include a mounting plate disposed in contact with the pump handle, the mounting plate having a recess that cooperates with the post to lock the pump handle in a first rotated orientation.

The locking mechanism may include a tab having a narrow portion and a wide portion, the misting device further having a locking channel disposed at the distal end of the tank, the tab cooperating with the locking channel to retain the pump handle in the retracted position. The misting device may further have a locking plate attached to the tank at the distal end of the tank, the locking plate including the locking channel, and the locking channel having a receiving end that is wider than the remainder of the locking channel, wherein the wide portion of the tab is inserted through the locking plate at the receiving end of the locking channel and the pump handle is rotated to prevent the wide portion from being removed through the locking plate at the receiving end. The misting device may further include a fluid delivery system receiving the fluid from the tank and emitting the fluid from near the proximal end of the tank into a surrounding environment as mist.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:
1. A misting device, comprising:
   a tank having a proximal end and a distal end and comprising a fluid chamber for containing a fluid;
   a barrel disposed in the tank and defining a barrel chamber; and
   a pump operable to pressurize the fluid chamber, the pump comprising:

a piston disposed in the barrel chamber and forming an air-tight seal with the barrel;

a rod attached to the piston and extending out of the barrel chamber, the rod comprising a mounting plate having a plurality of recesses;

a pump handle disposed at the distal end of the tank, the pump handle being rotatably attached to the rod so that the pump handle rotates around a first axis of the rod, being in contact with the mounting plate, and being movable between a retracted position against the tank and an extended position, the pump handle being rotatable around a second axis of the tank, the pump handle comprising:

- a post extending from the pump handle parallel to the rod toward the tank, wherein the post slides over a portion of the mounting plate to fit into one of the plurality of recesses to lock the pump handle in the retracted position when the pump handle is rotated in a first direction;
- an air channel disposed through the pump handle, the rod, and the piston; and
- a pressure relief valve disposed in the air channel and allowing airflow through the air channel and out of the misting device when the pump is operated and air pressure in the fluid chamber is at a maximum pressure.

2. The misting device of claim 1, wherein the air channel comprises a relief aperture disposed in the pump handle and providing an indication to a user of the device when air is flowing out of the misting device through the relief aperture.

3. The misting device of claim 2, wherein the indication comprises air blowing onto the user's hand.

4. The misting device of claim 1, wherein the pump is configured to inject air from the barrel chamber into the fluid chamber to pressurize the fluid chamber when the pump handle is depressed from the extended position to the retracted position.

5. The misting device of claim 4, wherein depressing the pump handle from the extended position to the retracted position when the fluid chamber is at the maximum pressure causes the air in the barrel chamber to flow through the air channel and out of the device.

6. The misting device of claim 4, wherein the pressure relief valve is a ball valve disposed within the piston.

7. The misting device of claim 1, wherein the pump handle further comprises a tab having a narrow portion and a wide portion, the misting device further comprising a locking plate that includes a locking channel and that is disposed at the distal end of the tank, the tab cooperating with the locking channel to retain the pump handle in the retracted position.

8. The misting device of claim 7, wherein the locking channel has a receiving end that is wider than the remainder of the locking channel, wherein the wide portion of the tab is inserted through the locking plate at the receiving end of the locking channel and the pump handle is rotated to prevent the wide portion from being removed through the locking plate at the receiving end.

* * * * *